W. H. MILLER.
PORTABLE DRINKING FOUNT.
APPLICATION FILED NOV. 10, 1916.

1,258,925.

Patented Mar. 12, 1918.
2 SHEETS—SHEET 1.

WITNESSES:
J. H. Gardner.
Myrtle McCoy.

INVENTOR:
William H. Miller,
BY
E. T. Silvius,
ATTORNEY.

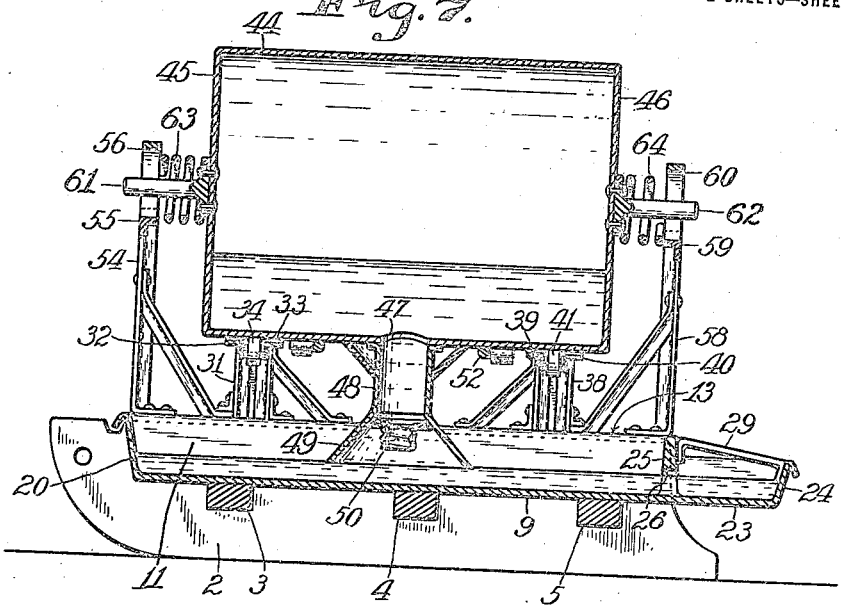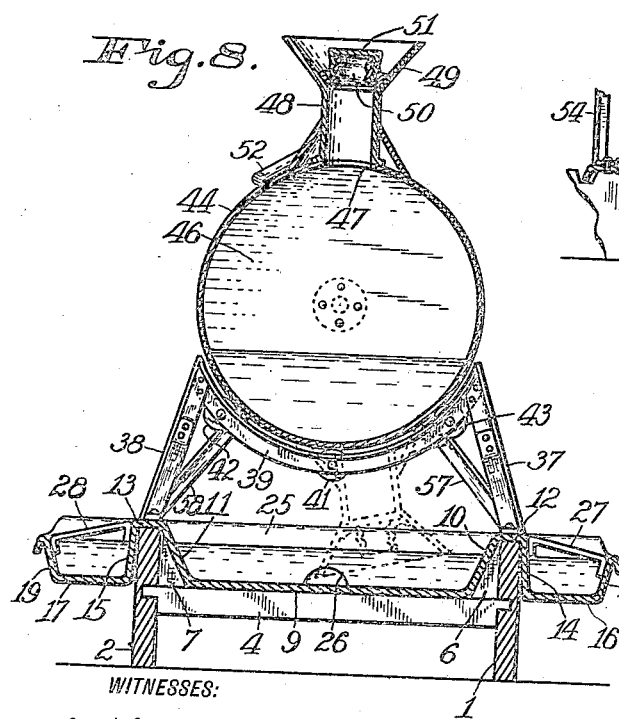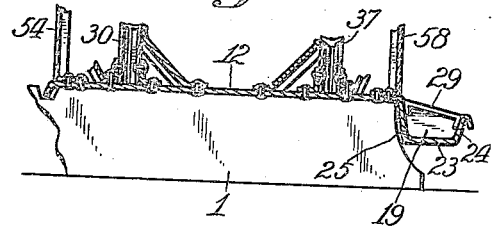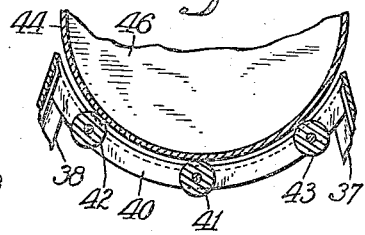

UNITED STATES PATENT OFFICE.

WILLIAM H. MILLER, OF CRAWFORDSVILLE, INDIANA, ASSIGNOR TO MILLER VEHICLE HEATER COMPANY, OF CRAWFORDSVILLE, INDIANA, A CORPORATION OF INDIANA.

PORTABLE DRINKING-FOUNT.

1,258,925.  Specification of Letters Patent.  Patented Mar. 12, 1918.

Application filed November 10, 1916. Serial No. 130,670.

*To all whom it may concern:*

Be it known that I, WILLIAM H. MILLER, a citizen of the United States, residing at Crawfordsville, in the county of Montgomery and State of Indiana, have invented a new and useful Portable Drinking-Fount, of which the following is a specification, reference being had to the accompanying drawings and to the letters and figures of reference marked thereon.

This invention relates to the type of drinking-fount that is designed to be used by animals and fowls, the invention having reference more particularly to a portable fount in which the water may be supplied automatically for use.

An object of the invention is to provide a generally improved drinking-fount and which may be constructed of large capacity and inexpensively. Another object is to provide a metallic drinking-fount of durable construction and which shall be economical in use. A further object is to provide a portable drinking-fount of such construction as to be adapted for conserving the drinking water and which may be readily kept in sanitary condition.

With the above-mentioned and other objects in view the invention consists in improved means for delivering or feeding water into a basin or drinking vessel in the proportion that may be consumed and so as to be capable of supplying different depths of water in the basin. The invention consists also in the parts and combinations and arrangements of parts as hereinafter particularly described and further defined in the accompanying claims.

Figure 1:
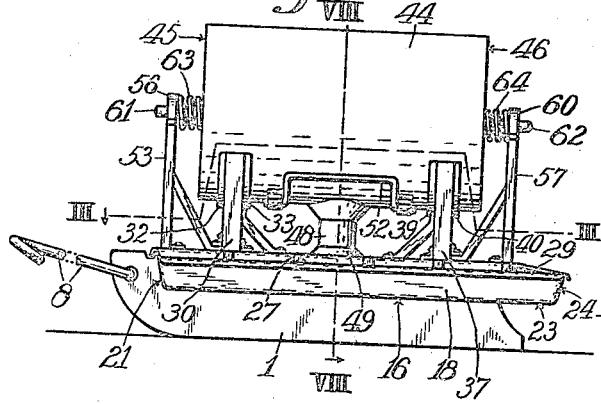
Figure 2:
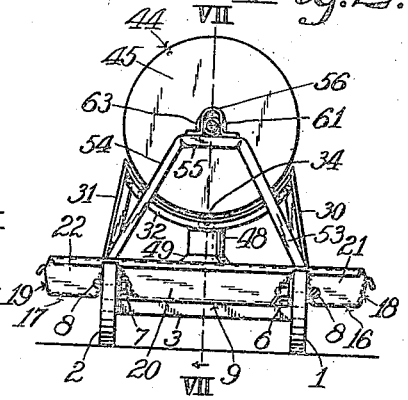
Figure 3:
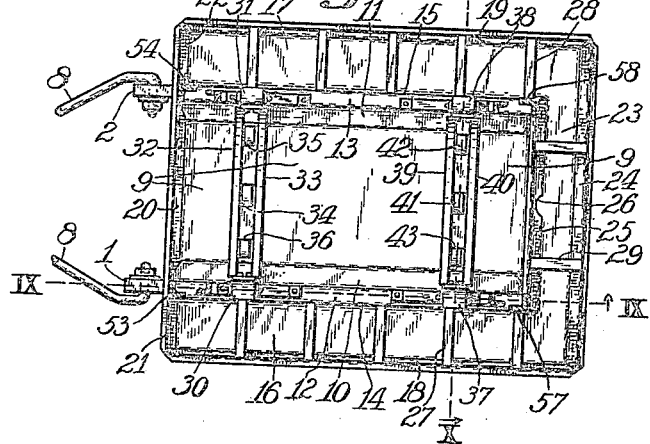
Figure 4:
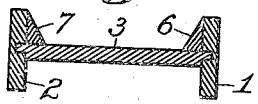
Figure 5:
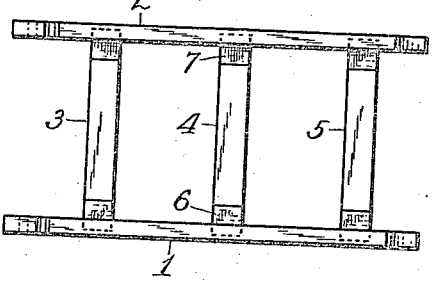
Figure 6:
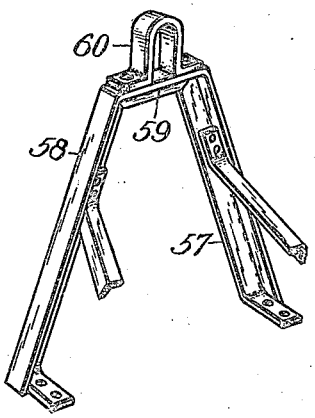

Referring to the drawings,—Figure 1 is a side elevation of the drinking-fount as preferably constructed; Fig. 2 is a front elevation of the drinking-fount; Fig. 3 is a sectional plan approximately on the line III—III on Fig. 1; Fig. 4 is a transverse section of the sled or supporting frame of the drinking-fount; Fig. 5 is a top plan of the sled or frame; Fig. 6 is a perspective view of frame elements of the structure comprised in the invention; Fig. 7 is a section on the line VII—VII on Fig. 2; Fig. 8 is a section on the line VIII—VIII on Fig. 1 but with the reservoir of the structure in a relatively different position; Fig. 9 is a fragmentary section on the line IX—IX on Fig. 3, and Fig. 10 is a fragmentary section on the line X—X on Fig. 3.

Similar reference characters on the various figures of the drawings indicate like elements or features of construction herein referred to.

As preferably constructed the metallic basin or vessel from which the water is to be drunk is provided with a suitable frame to support it at a proper distance above the ground, and preferably the frame is constructed as a sled comprising two runners 1 and 2 and a suitable number of cross-bars 3, 4, 5 secured to the runners, each cross-bar having brace blocks 6 and 7 secured thereto and to the adjacent runners, the faces of the brace blocks being inclined. The front end of the sled is provided with a draft device 8. The basin has a flat bottom 9 which is removably supported upon the cross-bars of the sled, and two inclined sides 10 and 11 that are supported against the brace blocks and extend upward to the tops of the runners 1 and 2 respectively, the sides having flat outwardly extending side plates 12 and 13 thereon that rest upon the tops of the runners 1 and 2 respectively. Two drinking troughs are arranged on the outer sides of the runners and comprise back plates 14 and 15, bottoms 16 and 17 and front plates 18 and 19 respectively, the back plates being connected to and extending downward from the side plates 12 and 13 respectively. The basin has a front wall 20 and the troughs have front ends 21 and 22 respectively which preferably are connected at the top with the top of the front wall. A rear trough is provided also which comprises a bottom 23 that is connected to the bottoms of the side troughs and has an outer or front wall 24 that is connected with the front plates 18 and 19, the back wall of the trough being formed by a partition 25 which is connected to the bottoms 9 and 23, the two bottoms being preferably integrally connected, the partition being connected to the rear ends of the sides 10 and 11 and the back plates 14 and 15 of the side troughs rearward of the runners 1 and 2. The basin is designed to receive the water from a reservoir and distribute it to the drinking troughs through an opening 26 formed in the under side of the partition 25. Troughs preferably are stiffened by means of braces 27 and 28 connected to the tops of the front and back plates of the side troughs and similar braces 29 connected to the front and back walls of the rear troughs.

For supporting the water-supplying reservoir a pair of trestles is provided, the trestles being alike and one comprises two legs 30 and 31 that are secured upon the side plates 12 and 13 of the basin and suitably braced, and two sag-beams 32 and 33 secured to the legs and supporting a suitable number of rollers 34, 35, 36, the tops of the sag-beams being concave. The remaining trestle comprises legs 37 and 38 secured also to the side plates 12 and 13 respectively and supporting two sag-beams 39 and 40 which support rollers 41, 42, 43 in spaced apart relation. The reservoir comprises a cylindrical shell 44 and two heads or end portions 45 and 46. The reservoir has only one opening therein, being an aperture 47 in the shell 44 to which is connected a neck 48 having a flaring or funnel-shaped mouth 49 in which is a short nipple 50 provided with a screw cap 51 for closing the neck when desired. Preferably the reservoir is provided with a suitable handle 52 whereby to turn the reservoir which is rotatively supported upon the rollers of the trestles, the shell 44 being directly in contact with the rollers.

Preferably two end frames are provided on the basin structure, one comprising two posts 53 and 54 secured upon the side plates 12 and 13 and suitably braced, a cross-bar 55 connected to the posts and a trunnion guide 56 fixed upon the cross-bar, the other comprising posts 57 and 58 secured also to the side plates 12 and 13, a cross-bar 59 secured to the posts and a trunnion guide 60 fixed on the cross-bar. The heads or ends 45 and 46 of the reservoir are centrally provided with trunnions 61 and 62 that project into the guides 56 and 60 respectively to prevent the reservoir from being dislodged from its supporting rollers when the sled is drawn on hill sides, and in order to prevent the reservoir from longitudinally sliding on its bearings when being moved up hill or down hill, a spring 63 is placed on the trunnion 61 in contact with the head 45 and the guide 56, a similar spring 64 being placed on the trunnion 62 in contact with the head 46 and the guide 60.

In constructing the drinking-fount in various sizes various modifications may be made, it being permissible to omit the trestles and rollers in the smaller size and support the reservoir by means of its trunnions, or to support the reservoir and guide it entirely by means of trestles and rollers; and various other modifications in the details are contemplated within the scope of the accompanying claims.

In practical use the reservoir is set so that the filling mouth 49 shall be uppermost, and having removed the cap 51 the reservoir is supplied with water through the neck 48, water delivered into the mouth 49 flowing over the top and through the nipple 50. After filling the reservoir the cap 51 is applied to the nipple 50 and the structure may then be drawn to a field or elsewhere that it may be needed or obviously may remain in position for use. In order to supply the drinking troughs the reservoir is turned over on its bearings until the filling neck is undermost, after which the cap 51 is removed from place to permit the water to flow from the reservoir into the basin and thence into the rear trough from which the water flows to the side troughs. When the mouth 49 is set with its front parallel with the bottom 9 of the basin the mouth will be closed to prevent the entrance of air when the water rises a relatively short distance above the bottom of the basin, which is desirable when a small quantity of water is needed. As the water is consumed so that its level is lowered, atmospheric air enters the mouth and passing upward into the reservoir partially destroys vacuum therein and releases more water. In case a larger quantity of water is required the reservoir is turned more or less so as to bring the filling neck to inclined position, as indicated by broken lines in Fig. 8, so that one portion of the front edge of the mouth 49 is elevated and permits a greater depth of water in the basin before the water shuts off the entrance of air into the mouth. The springs assist to prevent accidental rotary movement of the reservoir. In this way the basin may be entirely filled or sufficiently supplied to fill the troughs, the fronts of the troughs, however, being preferably of less height than the sides of the basin. The basin may be set upon the ground if desired.

Having thus described the invention, what is claimed as new is—

1. A drinking-fount including a basin having side plates on the tops of two opposite side walls thereof, two supports seated upon and secured to said side plates and spanning the basin, and a reservoir rotatably guided by the supports and having an outlet neck on one side portion thereof to be carried into the basin, the neck being adapted to variably feed a supply to the basin on rotary movement of the reservoir and to automatically maintain the water at a pre-determined level in the basin when the reservoir is at rest in adjusted position.

2. A drinking-fount including a basin having side plates on the tops of two opposite side walls thereof, two drinking troughs connected to the outer edges of the side plates respectively and having communication with the interior of the basin, two trestles spanning the basin and supported upon and secured to the side plates thereof, rollers mounted in the trestles, and a cylindrical reservoir mounted on the rollers and having an outlet neck to be carried thereby into the basin.

3. A drinking-fount including a basin having side plates on the tops of two opposite side walls thereof, two separate drinking troughs connected to the side plates respectively, a rear trough connected with the two troughs and having communication with the interior of the basin, the rear trough controlling supply to the others, two frames supported upon the side plates and provided each with a guide, and a reservoir having trunnions extending into the guides to be guided thereby, the reservoir having an outlet neck to be carried thereby into the basin, the neck being adapted to variably feed a supply to the basin on rotary movement of the reservoir.

4. In a drinking-fount, the combination of a basin having flat side plates, a trough having restricted feeding communication with the basin, a plurality of trestles, each trestle having legs secured upon the side plates of the basin and having two curved sag-beams that extend across and above the basin and are concave on their top portions, a plurality of rollers supported by the sag-beams of each of the trestles respectively, and a cylindrical reservoir rotatively supported upon all the rollers and having an outlet neck to be carried thereby into the basin.

5. In a drinking-fount, the combination of a basin having flat side plates, two trestles spanning the basin, each trestle having legs secured upon the side plates of the basin and having two curved beams that are concave on their top portions, a plurality of rollers supported by each of the beams of the trestles, a cylindrical reservoir rotatively supported upon all the rollers and having an aperture in its side, and an outlet neck connected with the aperture and having a flaring mouth portion to be adjusted to different angular positions in the basin, the mouth portion being adapted to variably feed a supply to the basin on rotary adjustment of the reservoir.

6. In a drinking-fount, the combination with a basin, and a trough having communication with the basin, of a plurality of frames spaced apart and secured upon the basin and having each a guide thereon, a cylindrical reservoir rotatively arranged between the frames and above the basin and having two trunnions on its ends respectively that extend into the guides of the frames respectively to be guided thereby, the reservoir having an outlet neck to be carried into the basin, and two springs encircling said trunnions respectively, each spring being in engagement with the adjacent end of the reservoir and also with the adjacent one of said guides.

7. In a drinking-fount, the combination of two runners, cross-bars secured to the runners, a basin bottom supported upon the cross-bars and having two sides that extend upwardly to the tops of the runners respectively, the sides having outwardly-extending side plates that rest upon the runners respectively, a front end connected to the basin bottom and sides, two troughs connected to said side plates respectively, and a rear trough connected with the side troughs, the back wall of the rear trough constituting the rear end of the basin and having an aperture in its lower portion for the passage of water, with a reservoir for supplying the basin with water.

In testimony whereof, I affix my signature in presence of two witnesses.

WILLIAM H. MILLER.

Witnesses:
JAMES PETERSON,
JUSTIN J. MOLONY.

Copies of this patent may be obtained for five cents each, by addressing the "Commissioner of Patents, Washington, D. C."